United States Patent
Bruhn

(10) Patent No.: US 11,038,787 B2
(45) Date of Patent: *Jun. 15, 2021

(54) SELECTING A PACKET LOSS CONCEALMENT PROCEDURE

(71) Applicant: Telefonaktiebolaget LM Ericsson (publ), Stockholm (SE)

(72) Inventor: Stefan Bruhn, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,535

(22) Filed: Oct. 1, 2019

(65) Prior Publication Data

US 2020/0036614 A1    Jan. 30, 2020

Related U.S. Application Data

(63) Continuation of application No. 16/129,211, filed on Sep. 12, 2018, now Pat. No. 10,476,769, which is a (Continued)

(51) Int. Cl.
*H04L 12/28* (2006.01)
*H04L 12/26* (2006.01)
(Continued)

(52) U.S. Cl.
CPC .......... *H04L 43/0829* (2013.01); *G10L 19/00* (2013.01); *G10L 19/005* (2013.01);
(Continued)

(58) Field of Classification Search
CPC .... G10L 19/005; G10L 25/18; H04L 43/0829
(Continued)

(56) References Cited

U.S. PATENT DOCUMENTS 6,456,719 B1   9/2002  Yuh
8,015,000 B2   9/2011  Zopf et al.
(Continued)

FOREIGN PATENT DOCUMENTS

EP    1458145 A1    9/2004
EP    1791115 A2    5/2007
(Continued)

OTHER PUBLICATIONS

Kos, Marko, et al., "Acoustic classification and segmentation using modified spectral roll-off and variance-based features", Digital Signal Processing, vol. 23, Mar. 1, 2013, pp. 659-674.
(Continued)

*Primary Examiner* — John Pezzlo
(74) *Attorney, Agent, or Firm* — Murphy, Bilak & Homiller, PLLC

(57) ABSTRACT

In accordance with an example embodiment of the present invention, disclosed is a method and an apparatus thereof for selecting a packet loss concealment procedure for a lost audio frame of a received audio signal. A method for selecting a packet loss concealment procedure comprises detecting an audio type of a received audio frame and determining a packet loss concealment procedure based on the audio type. In the method, detecting an audio type comprises determining a stability of a spectral envelope of signals of received audio frames.

14 Claims, 2 Drawing Sheets

Related U.S. Application Data continuation of application No. 15/629,426, filed on Jun. 21, 2017, now Pat. No. 10,103,958, which is a continuation of application No. 15/034,126, filed as application No. PCT/SE2015/050530 on May 12, 2015, now Pat. No. 9,712,414.

(60) Provisional application No. 61/993,814, filed on May 15, 2014.

(51) Int. Cl.
*H04L 29/06* (2006.01)
*H04L 29/14* (2006.01)
*G10L 19/005* (2013.01)
*G10L 19/00* (2013.01)
*H04J 1/16* (2006.01)
*G10L 25/51* (2013.01)
*G10L 25/18* (2013.01)

(52) U.S. Cl.
CPC ............ *H04L 65/601* (2013.01); *H04L 65/80* (2013.01); *H04L 69/40* (2013.01); *G10L 25/18* (2013.01); *G10L 25/51* (2013.01)

(58) Field of Classification Search
USPC ................................ 370/252, 271, 329, 487
See application file for complete search history.

(56) References Cited

U.S. PATENT DOCUMENTS

| | | |
|---|---|---|
| 2008/0046233 A1 | 2/2008 | Chen et al. |
| 2008/0235389 A1 | 9/2008 | Lindblom |
| 2009/0282298 A1 | 11/2009 | Zopf et al. |
| 2010/0070269 A1* | 3/2010 | Gao ........................ G10L 19/24 704/207 |
| 2010/0251051 A1* | 9/2010 | Sun ........................ G10L 19/005 714/747 |
| 2010/0318349 A1 | 12/2010 | Kovesi et al. |
| 2011/0007827 A1 | 1/2011 | Virette et al. |
| 2011/0305351 A1 | 12/2011 | Kimura |
| 2013/0246055 A1* | 9/2013 | Gao ........................ G10L 19/04 704/205 |
| 2014/0088976 A1 | 3/2014 | Zhao et al. |
| 2014/0286497 A1 | 9/2014 | Thyssen et al. |
| 2017/0011754 A1 | 1/2017 | Choo et al. |
| 2018/0012606 A1 | 1/2018 | Gao |

FOREIGN PATENT DOCUMENTS

| | | |
|---|---|---|
| EP | 2054876 A2 | 5/2009 |
| RU | 2325707 C2 | 5/2008 |
| RU | 2407071 C2 | 12/2010 |
| RU | 2417457 C2 | 4/2011 |
| WO | 1998013965 A1 | 4/1998 |
| WO | 2002033694 A1 | 4/2002 |

OTHER PUBLICATIONS

Pollak, Petr, et al., "Cepstral Speech/ Pause Detectors", IEEE, Jun. 22, 1995, pp. 1-4.

Warren, J.D., et al., "Analysis of the spectral envelope of sounds by the human brain", NeuroImage, vol. 24, Feb. 15, 2015, pp. 1052-1057.

* cited by examiner

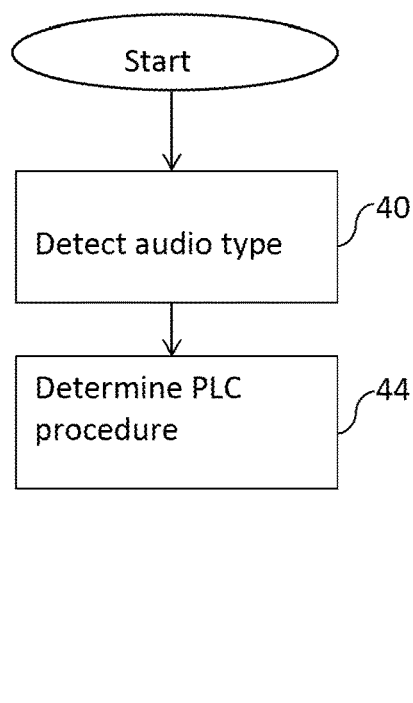
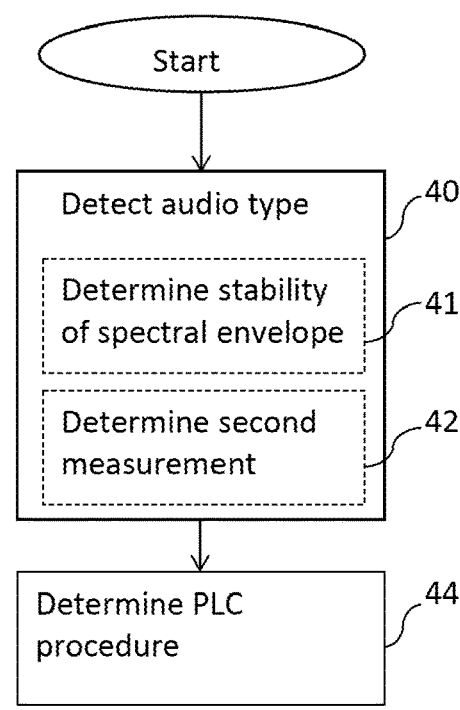
Figure 4A
Figure 4B
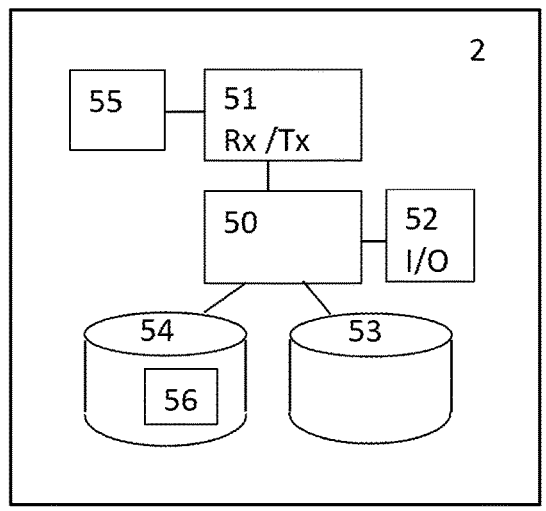
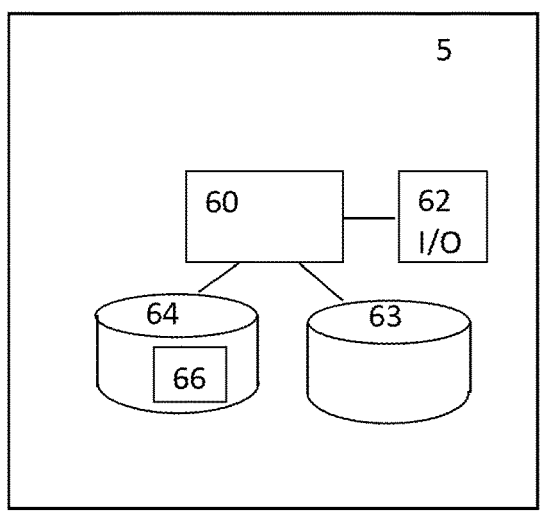
Figure 5
Figure 6
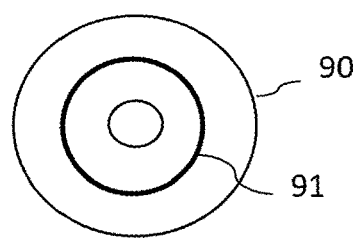
Figure 7

SELECTING A PACKET LOSS CONCEALMENT PROCEDURE

RELATED APPLICATIONS

This application is a continuation of U.S. application Ser. No. 16/129,211 filed on 12 Sep. 2018, which is a continuation of U.S. application Ser. No. 15/629,426 filed on 21 Jun. 2017, which is a continuation of U.S. application Ser. No. 15/034,126 filed on 3 May 2016 and now issued as U.S. Pat. No. 9,712,414, which is a national-phase application of PCT/SE2015/050530 filed under 35 U.S.C. § 371 on 12 May 2015, which claims priority to U.S. Provisional Application No. 61/993,814 filed on 15 May 2014.

TECHNICAL FIELD

The disclosure relates to audio decoding and more particularly to selecting a packet loss concealment procedure in audio decoding.

BACKGROUND

Cellular communication networks evolve towards higher data rates, together with improved capacity and coverage. In the 3rd Generation Partnership Project (3GPP) standardization body, several technologies have been and are also currently being developed.

LTE (Long Term Evolution) is a recent standardised technology. It uses an access technology based on OFDM (Orthogonal Frequency Division Multiplexing) for the downlink and Single Carrier FDMA (SC-FDMA) for the uplink. The resource allocation to wireless terminals (also known as user equipment, UEs) on both downlink and uplink is generally performed adaptively using fast scheduling, taking into account the instantaneous traffic pattern and radio propagation characteristics of each wireless terminal. Assigning resources in both downlink and uplink is performed in the scheduler situated in the radio base station.

For transmissions of audio data, as for all data over wireless interfaces, there are occasions when data is lost, e.g. due to path loss, interference, etc. When an audio frame is lost, a receiving audio decoder can detect the lost audio frame and can then perform a packet loss concealment (PLC) procedure to generate audio which as good as possible reduces the effects of the lost packet on the audio.

However, there are several possible PLCs procedures and it would be beneficial to correctly select what PLC procedure to use in different situations.

BRIEF DESCRIPTION OF THE DRAWINGS

The invention is now described, by way of example, with reference to the accompanying drawings, in which:

FIGS. 4A-B are flow charts illustrating methods performed in a host device being of FIG. 1 for selecting a packet loss concealment procedure;

FIG. 5 is a schematic diagram showing some components of the wireless terminal of FIG. 1;

FIG. 6 is a schematic diagram showing some components of the transcoding node of FIG. 1; and FIG. 7 shows one example of a computer program product comprising computer readable means.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
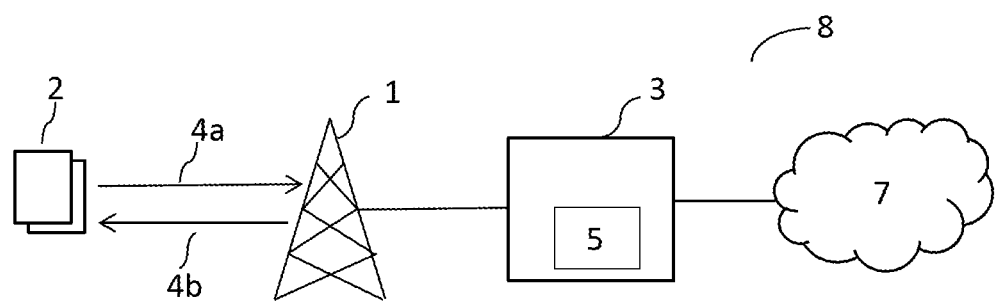
FIG. 1 is a schematic diagram illustrating a cellular network where embodiments presented herein may be applied.

FIG. 1 is a schematic diagram illustrating a cellular network 8 where embodiments presented herein may be applied. The cellular network 8 comprises a core network 3 and one or more radio base stations 1, here in the form of evolved Node Bs, also known as eNode Bs or eNBs. The radio base station 1 could also be in the form of Node Bs, BTSs (Base Transceiver Stations) and/or BSSs (Base Station Subsystems), etc. The radio base station 1 provides radio connectivity to a plurality of wireless terminals 2. The term wireless terminal is also known as mobile communication terminal, user equipment (UE), mobile terminal, user terminal, user agent, wireless device, machine-to-machine devices etc., and can be, for example, what today are commonly known as a mobile phone or a tablet/laptop with wireless connectivity or fixed mounted terminal.

The cellular network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink (UL) 4a communication from the wireless terminal 2 and downlink (DL) 4b communication to the wireless terminal 2 between the wireless terminal 2 and the radio base station 1 occur over a wireless radio interface. The quality of the wireless radio interface to each wireless terminal 2 can vary over time and depending on the position of the wireless terminal 2, due to effects such as fading, multipath propagation, interference, etc.

The radio base station 1 is also connected to the core network 3 for connectivity to central functions and an external network 7, such as the Public Switched Telephone Network (PSTN) and/or the Internet.

Audio data can be encoded and decoded by the wireless terminal 2 and/or a transcoding node 5, being a network node arranged to perform transcoding of audio. The transcoding node 5 can e.g. be implemented in a MGW (Media Gateway), SBG (Session Border Gateway)/BGF (Border Gateway Function) or MRFP (Media Resource Function Processor). Hence, both the wireless terminal 2 and the transcoding node 5 are host devices that comprise a respective audio decoder.

Figure 2:
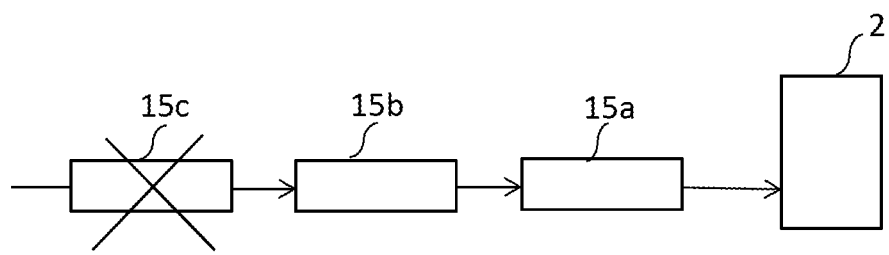
FIG. 2 is a schematic diagram illustrating audio frame transmissions to a wireless terminal of FIG. 1.

FIG. 2 is a schematic diagram illustrating audio frame transmissions to a wireless terminal of FIG. 1. When receiving audio e.g. for a voice conversation or even streaming audio, the wireless terminal 2 receives a stream of consecutive audio frames 15a-c. Each audio frame, length of e.g.

20-40 ms, is a digitally represented set of data and comprises a signal, i.e. an audio signal, encoded in an appropriate format.

In this example, the wireless terminal 2 receives a first audio frame 15a and a second audio frame 15b successfully. This allows the wireless terminal 2 to decode the audio signal comprised in the audio frames 15a-b. However, e.g. due to poor radio conditions, the third audio frame 15c is not received successfully. The audio decoder in the wireless terminal 2 detects the lost third audio frame and can then perform a packet loss concealment (PLC) procedure to generate audio which as good as possible reduces the effects of the lost packet on the audio.

A problem is how to make a decision among a multitude of PLC procedures within an audio decoder such that that procedure is selected that provides the best possible audio quality.

More specifically, an audio decoder may deploy at least two different PLC procedures, where one of them is especially suitable for music signals while a second PLC procedure is more suitable for non-music signals e.g. speech. In order to be able to choose the most suitable PLC procedure, the (coded) audio signal that has been received in good, i.e. error-free or non-erased packets (15a-b), is analysed, and based on such an analysis the choice of the PLC procedure is made.

A particular problem is to tailor the decision of PLC selection procedure such that the specific individual strengths of the available PLC procedures are utilised in a beneficial way. This involves finding a suitable signal related metric that is associated with the analysis of the received audio signal (or coding parameters thereof), and to find a suitable decision procedure that selects the PLC procedure based on the metric. For frame-based audio codecs it is also desirable that the PLC procedure decision can be made on a frame-by-frame basis, i.e. that a decision can be made in response to a currently received good audio frame and earlier received audio data.

One recent PLC procedure for audio is a so-called Phase ECU. This is a procedure that provides particularly high quality of the restored audio signal after packet loss in case the signal is a music signal.

The Phase ECU method consists in a concealment based on sinusoidal phase evolution. It is based on sinusoidal analysis and synthesis paradigm operated in DFT (discrete Fourier transform) domain. It is assumed that an audio signal is composed of a limited number of individual sinusoidal components. In the analysis step the sinusoidal components of a previously synthesized audio frame are identified. In the synthesis step these sinusoidal components are phased evolved to the time instant of the lost frame. Interpolative sinusoidal frequency refinement is done to increase the frequency resolution over that of the DFT. Instead of zeroing or magnitude adjusting DFT coefficients not belonging to spectral peaks, the original DFT magnitudes are retained while adaptive phase randomization is used.

Another class of PLC procedures are those that incorporate a pitch model. An underlying assumption of such procedures is that the signal may contain voiced segments of human speech, in which the signal is periodic with the fundamental frequency of a glottal excitation. Through incorporation of such a pitch model, the PLC procedure may achieve particularly good quality of the restored audio signal in case the signal is voiced speech.

It is known that the Phase ECU works very well for tonal music (single or multiple instruments playing sustained tones) and also for complex music signals (orchestra, pop music). On the other hand, there are sometimes deficiencies with the phase ECU for speech signal and particularly for voiced speech.

On the other hand it is notable that PLC procedures incorporating a pitch model often do not perform optimally on music signals and periodic generic audio signals. Rather, it is observed that general periodic audio signals like tonal music (single or multiple instruments playing sustained tones) are less suitable for PLC procedures using a pitch model.

Figure 3:
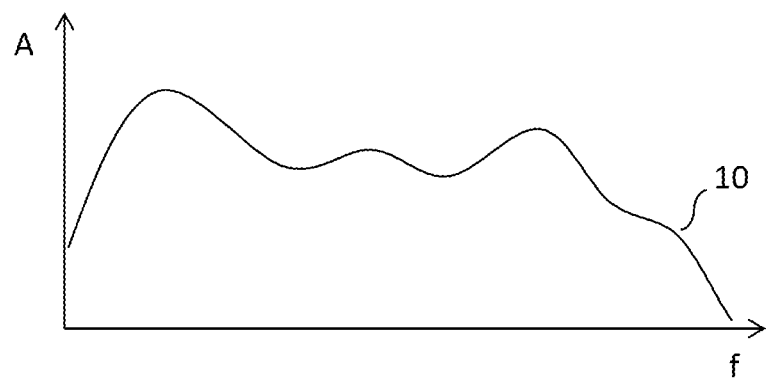
FIG. 3 is a schematic graph illustrating a spectral envelope of signals of received audio frames.

FIG. 3 is a schematic graph illustrating a spectral envelope 10 of signals of received audio frames. The horizontal axis represents frequency and the vertical axis represents amplitude, e.g. power, etc.

Looking now to both FIGS. 2 and 3, concepts will be presented regarding how a PLC procedure is selected in an audio decoder. It is to be noted that this can be performed in an audio decoder of the wireless terminal and/or the transcoder node of FIG. 1.

One solution to the selection of PLC procedure is, in an audio decoder deploying at least two different PLC procedures, to use a spectral envelope stability measure in the selection of the PLC procedure. This involves a first step of analysing at least a previously received audio signal frame with regards to its spectral envelope stability relative to the spectral envelope of at least one further previously received audio signal frame. The result of this analysis step is an envelope stability measure that is used in a second step. In that second step the envelope stability measure is used in a decision algorithm that in response to at least that measure selects one out of the multitude of PLC procedures, in case a subsequent audio frame is erased or deteriorated as a consequence of a loss or transmission error of an audio packet.

It is assumed that the audio decoder receives packets of coded audio data, which is structured in sets as shown in FIG. 2. Each set of coded audio data represents a frame 15a-c of the coded audio signal. The sets of coded audio data are produced by an audio encoder as the result of the encoding of the original audio signal. The sets of coded audio data are transmitted in packets to the decoder, typically as one or multiple sets per packet or in some cases as partial sets per packet.

After reception of the packets the audio receiver identifies the correctly received sets of coded audio data that can be decoded by the audio decoder. Sets corresponding to corrupted or lost packets are unavailable for decoding and the corresponding audio signal frames need rather to be restored by one of the available PLC procedures. The selection of the PLC procedure to be used for a given lost audio frame is described in the following.

First, the audio type is detected (see step 40 of FIGS. 4A-B) where at least one previously correctly received audio frame or its related coding parameters are analysed and stored for a potential subsequent frame loss in some memory (e.g. data memory 53 of FIG. 5 or 63 of FIG. 6). Typically, this analysis is done with the most recent correctly received audio frame prior to the loss. The analysis evaluates whether the audio signal is likely a speech signal or a music signal. The result of this analysis can be a measure defined in the value range from e.g. 0 to 1, where a value close to 0 represents a high likelihood that the signal is speech and where a value close to 1 represents a high likelihood that the signal is music, or vice versa.

One embodiment of the analysis step is to use spectral envelope stability as a measure for the likelihood if the signal frame is speech or music. The background of using spectral envelope stability as such an indicator is the observation that music tends to have a relatively stable spectral envelope over time or that the spectral envelope evolves slowly over time while the opposite is observed for speech. This measure evaluates the variability of the spectral envelope of the audio signal in the domain of spectral sub-band energies (also known as scale factors or norms). It is notable that this measure can e.g. also be used in an audio codec for controlling the noise floor of spectral sub-bands.

One way of calculating the spectral envelope stability measure is to compare a spectral envelope representation, e.g. a magnitude spectrum of the most recent correctly received frame with the spectral envelope representation of at least one earlier received frame, of which a representation has been stored in a memory. If there tends to be relatively strong changes in the envelope, the signal is assumed to be speech-like otherwise it is assumed to represent music. Accordingly, the envelope stability value will be set to values close to 0 or, respectively, close to 1. An inventive insight is that for frame losses of signals where the envelope stability indicator prior to the loss indicates a high stability, a PLC more suitable for music signals should be selected.

The actual decision of the PLC procedure is done in a second step, See step 44 of FIGS. 4A-B. Here the envelope stability measure calculated in a good frame prior to the frame loss is first restored from a memory and then compared to a threshold. As an example the threshold may be 0.5. If the envelope stability measure exceeds the threshold, the PLC procedure for music signals is chosen, otherwise that for speech signals.

According to one embodiment, the described envelope stability based decision method is used in one level in a multi-level decision method. Here, a first decision is made based on the envelope stability measure whether the PLC procedure more suitable for music is selected. Again, if the stability measure is above a certain threshold, the music signal PLC will be selected. If however this is not the case, a second decision method may be involved that compares other measures derived during the last good audio frame against a certain threshold. Examples for other measures are parameters that can be used for discrimination of voiced speech from unvoiced speech, like a pitch prediction gain (long term prediction gain) or e.g. the tilt of the envelope spectrum. If these values indicate that the audio signal is likely voiced speech (through relatively large values), then the selector chooses the PLC procedure that is more suitable for speech signals, otherwise the PLC procedure suitable for music is selected.

According to a further embodiment the PLC procedure decision may besides the envelope stability measure as one decision criterion also involve the calculation of further measures and their comparison against suitable threshold. Such measures may e.g. be a VAD (Voice activity detector) flag, power parameters, measures about the tonality of the signal, measures about how harmonic the signal is, measures about how spectrally complex the signal is, etc. A very tonal signal would have a relatively small number of distinct spectral peaks that are relatively stable compared to some earlier audio frame. A harmonic signal would have distinct spectral peaks at a fundamental frequency and integer multiples thereof. A spectrally complex audio signal (like e.g. from orchestra music with many contributing instruments) would have a relatively large number of spectral peaks with unclear relationship to each other. The decision method could take such additional measures into account, besides the envelope stability, when determining the PLC procedure to be used for the lost frame.

According to one embodiment, the PLC procedure that is most suitable to be used for detected music signals, or for signals with relatively stable spectral envelope, tonal signals, and/or spectrally complex signals is the phase ECU. Signals where rather another PLC procedure, with pitch model should be selected are those that are classified as speech and especially voiced speech, and signals that have a harmonic spectral structure and/or a spectral tilt typical for voiced speech.

FIGS. 4A-B are flow charts illustrating methods performed in an audio decoder of a host device (wireless terminal and/or transcoding node of FIG. 1) for selecting a packet loss concealment procedure.

In a detect audio type step 40, an audio type of a received audio frame is detected. This may comprise determining the audio type to be either music or speech. Optionally, there are more possible audio types, potentially comprising an audio type of 'unknown'.

In one embodiment, the audio type is determined to be music when the spectral envelope of received audio signals is stable. In such a case, the audio type is determined to be speech when the spectral envelope of received audio signals is unstable. Stable and unstable can e.g. be defined by comparing with a threshold value when the stability of the spectral envelope is a scalar.

Optionally, hysteresis is used in this step to prevent hopping back and forth in the audio type detection. Alternatively or additionally, a Markov chain can be used to increase stability of the classifying.

In a determine PLC procedure step 44, a packet loss concealment procedure is determined based on the audio type.

The method can be repeated as new audio frames are received, to ensure the most recent audio type is determined.

FIG. 4B illustrates a method for selecting a packet loss concealment procedure according to one embodiment. This method is similar to the method illustrated in FIG. 4A, and only new or modified steps, in relation to FIG. 4A, will be described.

Here, the detect audio type step 40 comprises an optional determine stability of spectral envelope step 41 and/or an optional determine 2nd measurement step 42.

In the optional determine stability of spectral envelope step 41, a stability of a spectral envelope of signals of received audio frames is determined. As explained above, this can be achieved by comparing a spectral envelope of signals of two (or more) correctly received consecutive audio frames.

Optionally, a scalar measurement related to the spectral envelope of received signals of received audio frames is calculated, e.g. with a value between 0 and 1 as described above.

In the optional determine 2nd measurement step 42, a second measurement of a received audio frame is determined. The second measurement comprises an indicator selected from the group consisting of pitch prediction gain, tilt of the spectral envelope, voice activity detector flag, power parameters, measure of a tonality of the signal, measure of how harmonic the signal is, and measure of how spectrally complex the signal is.

FIG. 5 is a schematic diagram showing some components of the wireless terminal 2 of FIG. 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the software instructions 56 to perform any one or more embodiments of the methods described with reference to FIGS. 4A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 53 is also provided for reading and/or storing data during execution of software instructions in the processor 50. The data memory 53 can be any combination of read and write memory (RAM) and read only memory (ROM).

The wireless terminal 2 further comprises an I/O interface 52 for communicating with other external entities. The I/O interface 52 also includes a user interface comprising a microphone, speaker, display, etc. Optionally, an external microphone and/or speaker/headphone can be connected to the wireless terminal.

The wireless terminal 2 also comprises one or more transceivers 51, comprising analogue and digital components, and a suitable number of antennas 55 for wireless communication with wireless terminals as shown in FIG. 1.

The wireless terminal 2 comprises an audio encoder and an audio decoder. These may be implemented in the software instructions 56 executable by the processor 50 or using separate hardware (not shown).

Other components of the wireless terminal 2 are omitted in order not to obscure the concepts presented herein.

FIG. 6 is a schematic diagram showing some components of the transcoding node 5 of FIG. 1. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the software instructions 66 to perform any one or more embodiments of the methods described with reference to FIGS. 4A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 63 is also provided for reading and/or storing data during execution of software instructions in the processor 60. The data memory 63 can be any combination of read and write memory (RAM) and read only memory (ROM).

The transcoding node 5 further comprises an I/O interface 62 for communicating with other external entities such as the wireless terminal of FIG. 1 (via the radio base station 1).

The transcoding node 5 comprises an audio encoder and an audio decoder. These may be implemented in the software instructions 66 executable by the processor 60 or using separate hardware (not shown).

Other components of the transcoding node 5 are omitted in order not to obscure the concepts presented herein.

FIG. 7 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 54 of FIG. 5 or the computer program product 64 of FIG. 6. While the computer program 91 is here schematically shown as a track on the depicted optical disk, the computer program can be stored in any way which is suitable for the computer program product, such as a removable solid state memory (e.g. a Universal Serial Bus (USB) stick).

Here now follows a set of embodiments to further describe the concepts presented herein.

The first embodiment comprises a method for selecting a packet loss concealment procedure, the method being performed in an audio decoder and comprising the steps of: detecting (40) an audio type of a received audio frame; and determining (44) a packet loss concealment procedure based on the audio type.

The second embodiment comprises the method according to the first embodiment, wherein the step of detecting (40) an audio type comprises the step of: determining (41) a stability of a spectral envelope of signals of received audio frames.

The third embodiment comprises the method according to the second embodiment, wherein the step of determining (41) a stability of a spectral envelope of signals of received audio frames comprises comparing a spectral envelope of signals of two (or more) correctly received consecutive audio frames.

The fourth embodiment comprises the method according to the second or third embodiment, wherein the step of determining (41) a stability of a spectral envelope of received signals of received audio frames comprises calculating a scalar measurement related to the spectral envelope of received signals of received audio frames.

The fifth embodiment comprises the method according to any one of second, third and fourth embodiment, wherein the step of detecting (40) an audio type further comprises the step of: determining (42) a second measurement of a received audio frame, the second measurement comprising an indicator selected from the group consisting of pitch prediction gain, tilt of the spectral envelope, voice activity detector flag, power parameters, measure of a tonality of the signal, measure of how harmonic the signal is, and measure of how spectrally complex the signal is.

The sixth embodiment comprises the method according to any one of the preceding embodiments, wherein the step of detecting (40) an audio type comprises determining the audio type to be either music or speech.

The seventh embodiment comprises the method according to the sixth embodiment when depending on the second embodiment, wherein the step of detecting (40) an audio type comprises determining the audio type to be music when the spectral envelope of received audio signals is stable and determining the audio type to be speech when the spectral envelope of received audio signals is unstable.

The eighth embodiment comprises a host device (2, 5) for selecting a packet loss concealment procedure, the host device comprising a processor (50, 60) and a memory (54, 64) storing instructions (56, 66) that, when executed by the processor, causes the host device (2, 5) to: detect an audio type of a received audio frame; and determine a packet loss concealment procedure based on the audio type.

The ninth embodiment comprises the host device (2, 5) according to the eighth embodiment, wherein the instructions to detecting an audio type comprise instructions that, when executed by the processor, causes the host device (2, 5) to determine a stability of a spectral envelope of signals of received audio frames.

The tenth embodiment comprises the host device (2, 5) according to the ninth embodiment, wherein the instructions to determine a stability of a spectral envelope of signals of received audio frames comprise instructions that, when executed by the processor, causes the host device (2, 5) to compare a spectral envelope of signals of two (or more) correctly received consecutive audio frames.

The eleventh embodiment comprises the host device (2, 5) according to the ninth or tenth embodiment, wherein the instructions to determine a stability of a spectral envelope of received signals of received audio frames comprise instructions that, when executed by the processor, causes the host device (2, 5) to calculate a scalar measurement related to the spectral envelope of received signals of received audio frames.

The twelfth embodiment comprises the host device (2, 5) according to any one of ninth, tenth and eleventh embodiment, wherein the instructions to determine a packet loss concealment procedure further comprise instructions that, when executed by the processor, causes the host device (2, 5) to determine a second measurement of a received audio frame, the second measurement comprising an indicator selected from the group consisting of pitch prediction gain, tilt of the spectral envelope, voice activity detector flag, power parameters, measure of a tonality of the signal, measure of how harmonic the signal is, and measure of how spectrally complex the signal is.

The thirteenth embodiment comprises the host device (2, 5) according to any one of the eighth to twelfth embodiment, wherein the instructions to detect an audio type comprise instructions that, when executed by the processor, causes the host device (2, 5) to determine the audio type to be either music or speech.

The fourteenth embodiment comprises the host device (2, 5) according to thirteenth embodiment when depending on the ninth embodiment, wherein the instructions to detect an audio type comprise instructions that, when executed by the processor, causes the host device (2, 5) to determine the audio type to be music when the spectral envelope of received audio signals is stable and determining the audio type to be speech when the spectral envelope of received audio signals is unstable.

The fifteenth embodiment comprises the host device (2) according to any one of the eighth to fourteenth embodiment wherein the host device is a wireless terminal (2).

The sixteenth embodiment comprises the host device (5) according to any one of the eighth to fourteenth embodiments wherein the host device (5) is a transcoding node arranged to perform transcoding of audio.

The seventeenth embodiment comprises a computer program (66, 91) for selecting a packet loss concealment procedure, the computer program comprising computer program code which, when run on a host device (2, 5) causes the host device (2, 5) to: detect an audio type of a received audio frame; and determine a packet loss concealment procedure based on the audio type.

The eighteenth embodiment comprises a computer program product (64, 90) comprising a computer program according to the seventeenth embodiment and a computer readable means on which the computer program is stored.

The invention has mainly been described above with reference to a few embodiments. However, as is readily appreciated by a person skilled in the art, other embodiments than the ones disclosed above are equally possible within the scope of the invention.

What is claimed is:

1. A method for selecting a packet loss concealment procedure, the method comprising:
   detecting an audio type of a received audio frame, wherein detecting an audio type comprises determining a stability of a spectral envelope of signals of received audio frames; and
   in response to detection of a frame loss, determining a packet loss concealment procedure based at least partially on the audio type of the preceding correctly received audio frame.

2. The method according to claim 1, wherein determining the stability of the spectral envelope of signals of received audio frames comprises comparing the spectral envelope of signals of at least two correctly received consecutive audio frames.

3. The method according to claim 1 wherein determining the stability of the spectral envelope of signals of received audio frames comprises calculating a scalar measurement related to the spectral envelope of signals of received audio frames.

4. The method according to claim 1, wherein detecting an audio type comprises determining the audio type to be either music or speech.

5. The method according to claim 4, wherein detecting an audio type comprises determining the audio type to be music when the spectral envelope of signals of received audio frames is stable and determining the audio type to be speech when the spectral envelope of signals of received audio frames is unstable.

6. The method according to claim 4, wherein a sinusoidal phase evolution based packet loss concealment procedure, Phase ECU, is selected in case the determining of the audio type indicates music as an audio type.

7. An apparatus for selecting a packet loss concealment procedure, the apparatus comprising:
   a processor; and
   a memory storing instructions that, when executed by the processor, causes the apparatus to:
      detect an audio type of a received audio frame, wherein detecting an audio type comprises determining a stability of a spectral envelope of signals of received audio frames and
      in response to detection of a frame loss, determine a packet loss concealment procedure based at least partially on the audio type of the preceding correctly received audio frame.

8. The apparatus according to claim 7, wherein the instructions to determine the stability of the spectral envelope of signals of received audio frames comprise instructions that, when executed by the processor, causes the apparatus to compare the spectral envelope of signals of at least two correctly received consecutive audio frames.

9. The apparatus according to claim 7, wherein the instructions to determine the stability of the spectral envelope of signals of received audio frames comprise instructions that, when executed by the processor, causes the apparatus to calculate a scalar measurement related to the spectral envelope of signals of received audio frames.

10. The apparatus according to claim 7, wherein the instructions to detect an audio type comprise instructions that, when executed by the processor, causes the apparatus to determine the audio type to be either music or speech.

11. The apparatus according to claim 10, wherein the instructions to detect an audio type comprise instructions that, when executed by the processor, causes the apparatus to determine the audio type to be music when the spectral envelope of signals of received audio frames is stable and determining the audio type to be speech when the spectral envelope of signals of received audio frames is unstable.

12. The apparatus according to claim 7, wherein the apparatus is an audio decoder.

13. The apparatus according to claim 7, wherein the apparatus is comprised in a transcoding node arranged to perform transcoding of audio.

14. A non-transitory computer readable-medium storing a computer program comprising program instructions that, when executed by processing circuitry of an apparatus, configures the apparatus to select a packet loss concealment procedure, said program instructions including instructions configuring the apparatus to:
- detect an audio type of a received audio frame, wherein detecting an audio type comprises determining a stability of a spectral envelope of signals of received audio frames; and
- in response to detection of a frame loss, determine a packet loss concealment procedure based at least partially on the audio type of the preceding correctly received audio frame.

* * * * *